United States Patent

Gardner

[15] 3,651,831
[45] Mar. 28, 1972

[54] SAFETY BLEEDER VALVE

[72] Inventor: Irving Gardner, Hunter, N.Y. 12442

[22] Filed: Apr. 29, 1970

[21] Appl. No.: 32,916

[52] U.S. Cl. .............................. 137/588, 251/113, 251/215
[51] Int. Cl. .................................. F16k 35/04, F16k 45/00
[58] Field of Search .................. 137/588; 251/133, 215, 205, 251/144

[56] References Cited

UNITED STATES PATENTS

| | | | |
|---|---|---|---|
| 3,280,836 | 10/1966 | Callahan, Jr. et al. | 251/205 X |
| 1,444,780 | 2/1923 | Davis | 251/113 |
| 454,640 | 6/1891 | Farmer | 251/113 |

FOREIGN PATENTS OR APPLICATIONS

| | | | |
|---|---|---|---|
| 587,735 | 6/1959 | Italy | 137/588 |

*Primary Examiner*—William R. Cline
*Attorney*—Polachek, Saulsbury & Hough

[57] ABSTRACT

A safety bleeder valve of the globe type for propane gas delivery trucks for preventing the possibility of the accidental or unintentional opening of the valve and escape of gas from the valve when the delivery hose is off its support on the truck and detached from the tank or container being supplied with gas or opening of the valve due to vibration when the vehicle is in motion. The safety valve has end and side walls with an inlet in one end wall and an outlet in the side wall. A threaded stem slides through an opening in the other end wall. A valve head is carried on one end of the stem and adapted to seat on a seat formed in the one end wall. The other end of the stem has a hand wheel for turning the stem. Ratchet teeth on the hand wheel coact with a slidable spring pressed core mounted on the side wall for holding the wheel and stem from rotating. A rotatable ring is provided for connecting the valve body to the inlet of a tank being supplied with gas. Gas bleed means is formed on the valve body for releasing the gas pressure on the rotatable ring to facilitate breaking the connection with the inlet on the tank. Cooperating indicia on the valve body and a skirt of the hand wheel indicate relative wear of a valve head when the hand wheel is rotated to close the valve.

9 Claims, 10 Drawing Figures

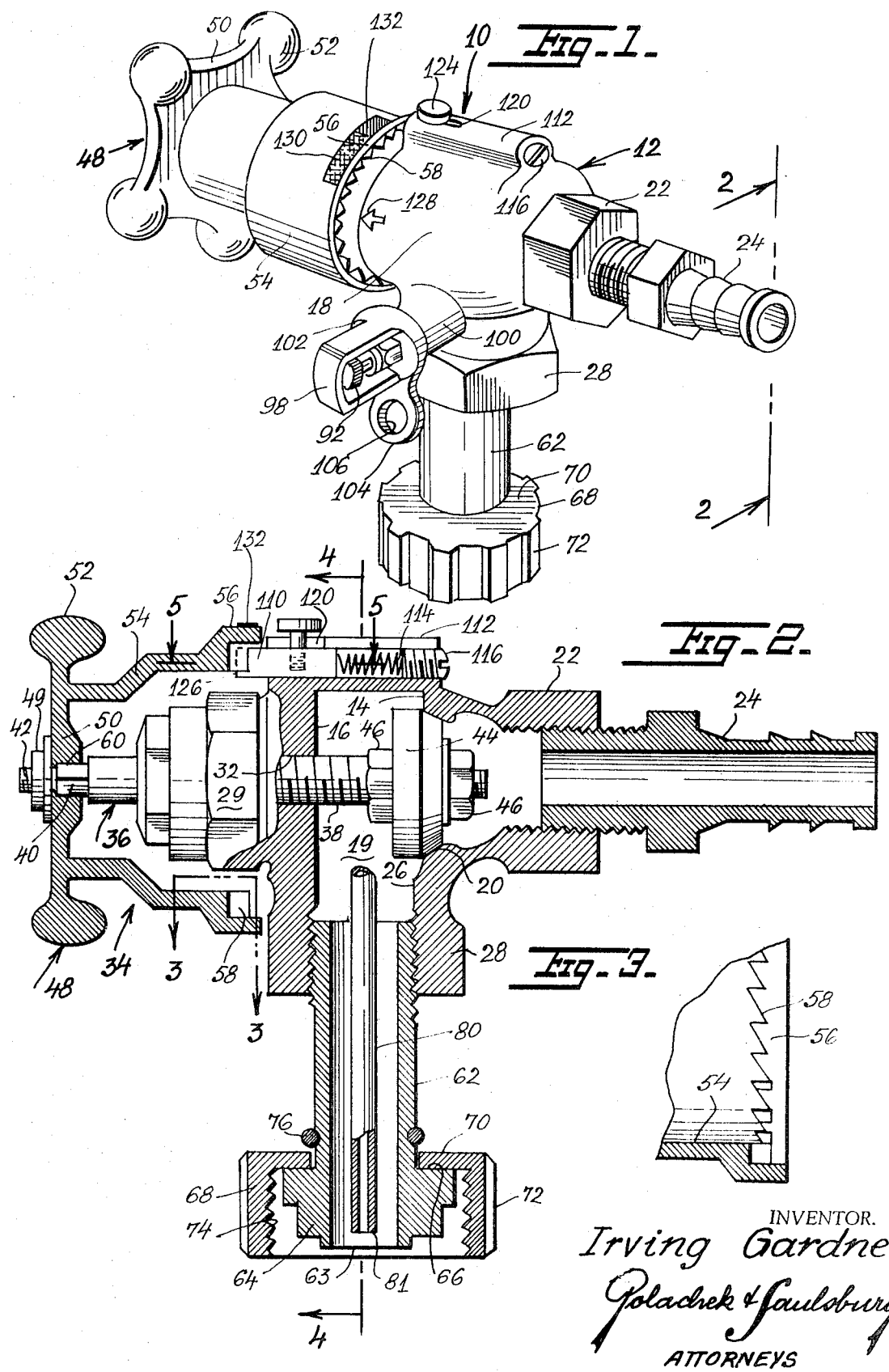

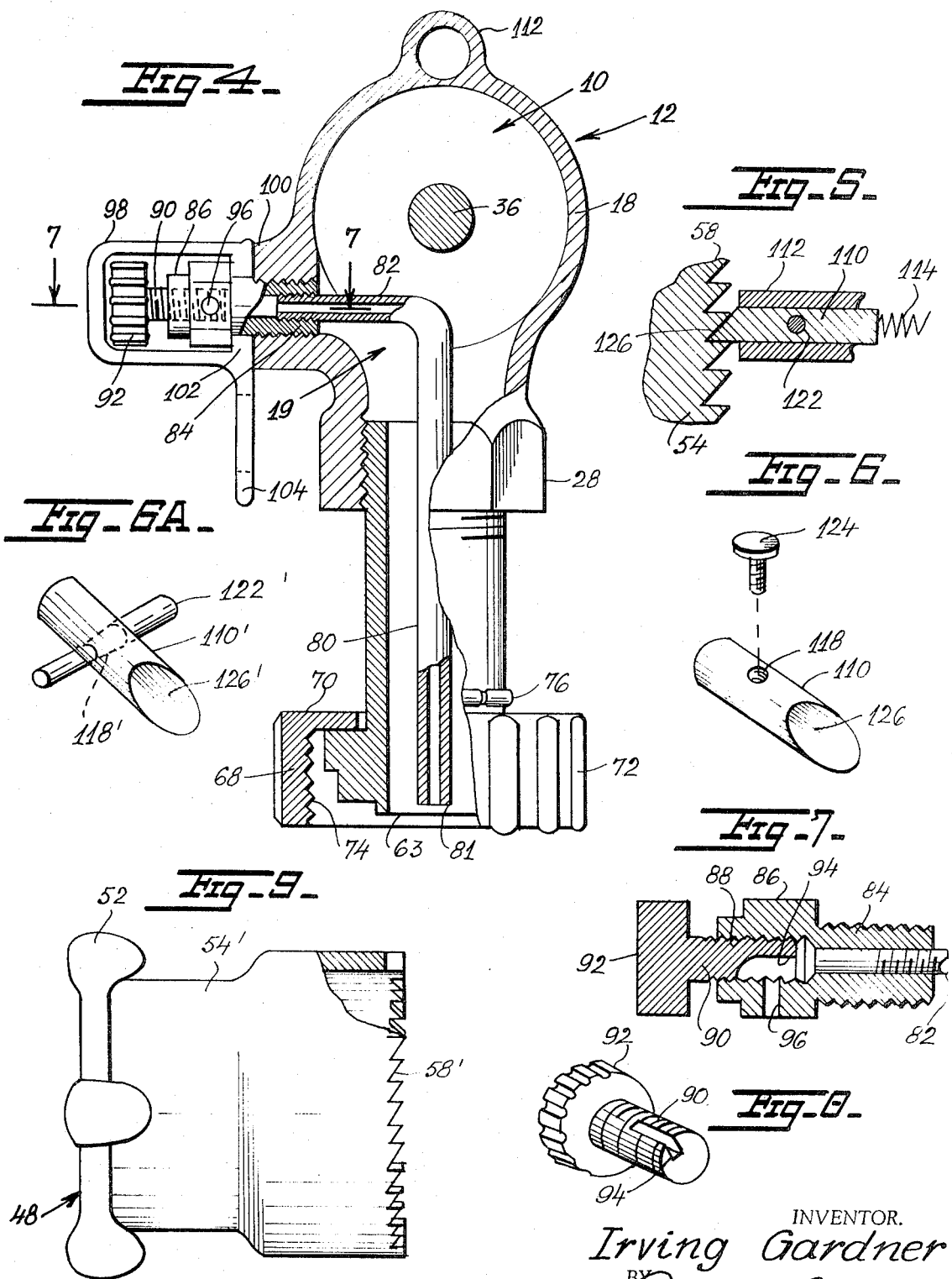

3,651,831

SAFETY BLEEDER VALVE

This application describes and claims subject matter described and claimed in my previous application Ser. No. 695,121 filed Jan. 2, 1968, now abandoned.

In trucks delivering pressurized liquified hydrocarbon fuel, e.g., propane, butane, etc., the pressurized fuel in liquid state is usually delivered through a long rubber hose with a valve on the free end thereof and when the hose is not in use, it is hung on a hook or the like on the truck out of the way. Oftentimes, however, due to vibration of the truck in transit, or when the truck is hit accidentally, the valve is accidentally opened permitting the gas to escape.

An important object of the present invention is to provide a safety means on the valve preventing the possibility of the accidental or unintentional opening of the valve and escape of the fuel in either liquid or gas form from the valve when the delivery hose is off its support on the truck and detached from the tank or container being supplied with fuel.

Another object of the invention is to provide a safety valve for fuel delivery trucks having means for automatically locking the valve when in closed position, said locking device having to be manually released before the valve can be opened so that the gas or liquid fuel cannot be turned on or escape except by premeditation on the part of the user, thereby preventing any looseness of the valve or accidental touching of a valve part causing the valve to again open after it has once been turned off.

Still another object of the invention is to provide a safety valve for delivery trucks with means for fast bleeding of the fuel, preferably in liquid state, thereby preventing frosting up at the connection between the valve and tank being supplied with gas.

Yet another object of the invention is to facilitate assembly of a fuel valve by simultaneously connecting the valve to a valve casing and a dip tube to the valve.

A specific object of the invention is to provide a valve locking and releasing mechanism that may be readily operated with the thumb or a finger of the hand of the user or operator.

A further object of the invention is to provide a means on the exterior surface of a fuel valve for visually indicating relative wear of a valve head, thereby guarding against leakage.

FIG. 1 is a perspective view of a safety valve embodying the invention.

FIG. 2 is a vertical sectional view taken on the plane of the line 2–2 of FIG. 1, on an enlarged scale.

FIG. 3 is a sectional view taken on the plane of the line 3—3 of FIG. 2.

FIG. 4 is a vertical sectional view taken on the plane of the line 4—4 of FIG. 2.

FIG. 5 is a horizontal sectional view taken on the plane of the line 5—5 of FIG. 2.

FIG. 6 is a detail perspective view of the sliding core.

FIG. 6A is a similar view to FIG. 6 showing another form of handle for the slide core.

FIG. 7 is a horizontal sectional view taken on the plane of the line 7—7 of FIG. 4.

FIG. 8 is a detail perspective view of the actuating stem of the bleed mechanism.

FIG. 9 is a side elevational view of a modified form of valve actuating device.

Referring now in detail to the various views of the drawings, In FIG. 1, a safety valve embodying the invention is illustrated and designated generally at 10. The valve 10 comprises the usual shell or casing 12 substantially spherical in shape with a front wall 14, a rear wall 16, and side wall 18 as shown in FIG. 2. The walls define a valve chamber 19. The front wall 14 is formed with a central opening 20 constituting a valve seat communicating with a tubular inlet portion 22 which is internally screw threaded to receive the threaded end of a connecting pipe 24, the other end of the pipe adapted to be connected to a supply hose (not shown). The bottom of the side wall is formed with an opening 26 communicating with an internally screw threaded tubular inlet portion 28. The rear wall 16 is formed with a laterally extending enlargement 29, the wall and enlargement being formed with a central bore 32, the bore portion of the rear wall being internally screw threaded. The outer surfaces of the inlet portion 22, inlet portion 28 and enlargement 29 are hexed to receive a turning tool.

The valve device 34 for closing off communication between the valve chamber 19 and the inlet portion 22 comprises an elongated valve stem 36. The inner end of the stem as viewed in FIG. 2 is externally screw threaded as indicated at 38, and its outer end is formed with a non-circular portion 40 terminating in a reduced threaded extremity 42. The stem carries a frusto-conical shaped valve head 44 on its inner end secured thereon by nuts 46 on opposite sides thereof.

In accordance with he invention, the valve stem 36 is screwed inwardly or outwardly in the rear wall 16 carrying the valve head 44 into seating engagement with the valve seat 20, or out of engagement with said seat by means of a turnable handle or wheel member 48. The wheel member is locked on the stem by means of a nut 49 threaded on the extremity 42. The wheel member has a disc-shaped body 50 formed with spaced enlargements 52 extending laterally and inwardly on the periphery of the body serving as finger grips to facilitate turning of the wheel assembly member. A hollow cylindrical stepped skirt portion 54 is formed integrally with the body adjacent the periphery thereof and extends inwardly thereof as viewed in FIG. 2. The inner end edge of the skirt portion is formed with an enlarged offset annular flange portion 56 inwardly of its outer edge on which there is a series of ratchet teeth 58 in annular formation, the teeth being protected by the outwardly extending peripheral end edge of the flange portion 56. The disc-shaped body 50 of the wheel member is formed with a central non-circular opening 60 to receive the non-circular end portion 40 of the valve stem 36 to prevent relative rotary motion between the disc body and stem. When the non-circular portion 40 of the stem is in operative position in the disc-shaped body 50, the threaded extremity 42 of the stem extends outwardly beyond the disc-shaped body to receive the locking nut 49. By merely turning the handle member 48, the valve stem 36 is moved inwardly or outwardly carrying the valve head 44 toward or away from the valve seat 20.

Means is provided for attaching the valve casing 12 to a storage tank or container (not shown), being supplied with fuel. For this purpose, a pipe 62 has one end externally threaded for engagement with the threaded inlet portion 28. The other end of the pipe 62 is formed with an integral stepped enlargement 64 forming a shoulder 66. A connecting ring member 68 is rotatably supported on the shoulder 66 by way of an inwardly extending flange 70 formed on one end thereof, which seats on the shoulder 66. The annular body of the ring member is formed with corrugations 72 on its outer surface and with screw threads 74 on its inner surface. A split ring member is adapted to be threaded onto the externally screw threaded inlet portion of a tank or container (not shown) being supplied with fuel.

Fuel bleeding means is provided in the valve 10 on the side wall 18 adjacent the inlet portion 28 for releasing pressure on the connection between the ring member 68 and the inlet portion of the tank or container being supplied with the pressurized fuel, to facilitate bleeding of the connection between the valve and tank or container. For this purpose a dip bleeder tube 80 extends centrally through the inlet portion 28 with its bottom open face 81 positioned above the bottom face 63 of the pipe 62 which is above the gas tank, and through the connecting pipe 62 into the valve chamber 19 where it is bent at its inner end at right angles as indicated at 82 and externally screw threaded with running threads at its inner extremity for engagement with an internally and externally screw threaded sleeve 84 formed with an enlarged annular portion 86 adjacent one end thereof, the inner bore of the sleeve being enlarged as indicated at 88 and internally screw threaded to receive a solid externally tapered screw threaded stem serving as a rotatable valve 90. The valve 90 is formed with an integral handle or knurled knob 92 on one end for actuating the valve, and with a slot 94 in the body thereof intersecting the other end thereof. The enlarged annular portion 86 of the sleeve 84 is formed with a fuel bleed port or vent 96 communicating with the enlarged bore portion 88 of the sleeve and with the atmosphere. The valve member 90 and handle 92 are protected by an open frame 98 secured to a tubular socket 100 formed on the side wall adjacent the inlet portion 28. The frame is formed with a base 102 from which an integral radial handle 104 is formed with a finger hole 106 extending laterally for manipulating the frame. The other end 81 of the tube 80 extends through the pipe 62 and ring 68 above the seat of the fill valve and above the liquified fuel in the tank or container being supplied with the fuel.

An important feature of the present invention is the means provided for locking the valve head 44 on its seat 20 thereby preventing accidental displacement thereof and opening of the valve to permit escape of the fuel. This means is best shown in FIGS. 2, 5 and 6 and includes an elongated solid core 110, round in cross-section, slidably mounted in an integral tubular bearing member 112 integrally formed on the casing 12 on the top of the side wall 18 thereof. The core normally extends outwardly of one end of the bearing member 112 and is urged outwardly to this position by a compression spring 114 interposed between the inner end of the slide core and a closure screw 116 threaded into the other threaded end of the tubular member. The slide core 110 is formed with a central hole 118 as seen in FIG. 6 and the tubular bearing 112 is formed with an elongated closed slot 120 in line with hole 118. A pin 122 extends through the slot 120 and is fixed in hole 118 and carries a button or handle 124 on its outer protruding end for sliding the core against the action of the spring 114. The protruding end of the core is formed with a tapered face forming a knife edge 126. The core is in line with the ratchet teeth 58 on the skirt 54 of the hand wheel 48 and its knife edge 126 extends inwardly of the flanges 56 and is adapted to engage in the ratchet teeth 58 to prevent rotation of the handle or wheel 48 and thus prevent screwing action of the stem 36 thereby locking the valve head 44 on its seat 20, so that no fuel can escape through the inlet 28, pipe 62 and ring 68. In FIG. 6A the operating handle 122' is in the form of a horizontal pin extending through a conical hole 118' in the slide block 110' right angles to the plane of the knife edge 126' and protruding at both sides from the slide core 110' to facilitate withdrawal of the knife edge 126' from engagement with ratchet teeth 58.

As the handle member 48 is turned, the valve head 44 is moved toward the valve seat 20 and as it approaches closing position, the spring pressed knife edge 126 of the core 110 will engage the ratchet teeth 58 and will prevent accidental opening of the valve head 44 from its locked valve seat 20.

In operation, the valve 10 is connected to the inlet of the tank or container to be supplied with fuel by means of the connecting ring member 68, the bleeder tube 80 is positioned above the liquid hydrocarbon fuel in the tank. The valve head 44 may then be moved off its seat 20 by turning the hand wheel 48, after the safety locking core 110 having first been moved inwardly away from its intralock with the ratchet teeth 58 by its projecting button 124.

After the locking core 110 is disengaged from teeth 58, the holding button 124 may be released and the hand wheel member 48 is freely turned, further opening the valve.

While closing the valve, the knife edge 126 of the core is automatically returned to normal protruding position by its spring. The hand wheel member 48 is turned in the proper direction moving the valve head 44 inwardly onto its closed position on the seat 20. During the latter part of this closing operation, the protruding knife edge 126 of the slide core engages the teeth 58, the teeth sliding over the knife edge in a ratchet-like manner until the valve head 44 reaches its seat whereupon the knife edge automatically snaps into the base of one of the teeth 58 as shown in FIG. 5, thereby locking the valve against accidental displacement from the seat and thus preventing any escape of fuel.

In accordance with this invention, means is provided on the exterior surface of the valve whereby wear on the valve head may be observed so that the valve head may be replaced before such wear reaches dangerous proportions. The means indicating such valve wear includes cooperating indicia on the annular flange 56 of the skirt portion of the hand wheel 48 and further indicia on the exterior of the side wall 18 of the valve 10. It will be appreciated that if there were no valve head wear, the hand wheel would always maintain the same orientation with respect to the valve 10 each time the valve head 44 were seated against the central opening 20. Additionally, the same amount of rotation of the hand wheel 48 would be required to move the valve head 44 from the fully opened to fully closed positions. Because the surfaces of the valve head 44 which contact the central opening 20 gradually wear as the valve is used, the hand wheel 48, and hence the threaded stem 38, must be turned an additional amount to fully seat the valve head.

The means for indicating valve head wear utilizes this phenomenon in conjunction with visual indicia so that the amount of additional rotation of the hand wheel 48 is indicated readily. Therefore, the user will be able to note gradual valve head wear and will take the valve out of service for repair before such wear reaches dangerous proportions.

The indicia includes a heavy arrow 128 (see FIG. 1) imprinted on the side wall 18. This arrow 128 is the fixed point of reference. The mating indicia on the annular flange 56 of the skirt 54 is divided into zones so that the gradual wear can be noted. A first zone 130 is suitably colored to indicate that although caution is advised under normal operating procedure, the valve head 44 is not worn enough to constitute a hazard. A suitable color for such zone would be yellow as is indicated in the illustration. A second zone 132 would indicate excessive valve wear and would warn the operator to replace the valve or repair the same. This second zone can be suitably colored red as is also illustrated in the drawing.

The zones 130, 132 are aligned next to one another and positioned for tightening of the valve when the hand wheel is rotated in a clockwise direction. Of course, if a reverse direction tightening valve is utilized, the positions of the zones would also be reversed. One will observe that the valve illustrated is closed by turning the hand wheel in a clockwise direction, until the valve head 44 seats against the central opening 20. The zones 130, 132 will assume a definite position with respect to the arrow 128 upon final seating of the valve head 44. The final position of the zones with respect to the arrow 128 when the valve is closed will indicate relative valve wear. It should also be noted that the illustration of FIG. 1 shows the valve in opened position wherein the positions of the zones 130, 132 and the arrow 128 are random and have no bearing with respect to valve wear. The only time the zones and the arrow indicate valve wear is when the valve is closed.

In order to detach the valve 10 from the inlet of the filled tank, the knob 92 is manually turned to bring the slot 94 of the valve 90 into registery with the fuel vent 96 in the sleeve 84 whereby fuel pressure between the valve and the automatically closed tank seal is relieved through the vent 96. The pressure within the valve body between the seated valve head 44 and the connecting ring 68 forces the pressurized liquified fuel through the dip tube 80 and outwardly through the bleed post 96 and the ring member connection with the tank is easily broken and the valve removed therefrom.

The valve is readily assembled and disassembled. In assembling, the threaded bent end 82 of the dip tube 80 is manually inserted through the enlargement 28 of the valve body and the end of the bent end 82 is aligned with the outer end of the internal threads 84 on the valve stem 90 whereupon, while the dip tube 80 is manually held, the knob 92 is turned in the proper direction thereby simultaneously threading the stem into the socket 100 of the casing and at the same time threading the stem 90 onto and along the threaded end of the bent portion 82 of the dip tube 80, leaving the outer end of the dip tube inwardly of the outer or bottom end of the ring 68. The pipe 62 carrying the ring 68 is then inserted over the dip tube and threaded into the socket or enlargement 28. The dip tube is, because of its connection to the sleeve 84, thus protected by the pipe 62 and is prevented from falling out or becoming displaced.

It is not necessary to form the locking teeth 58 to coact with the locking core 110 on the inner surface of the skirt portion of the hand wheel, as shown in FIG. 2, but the teeth may be formed on the outer peripheral edge of the skirt portion 54' as shown in FIG. 9 wherein the teeth 58' are shown exposed and not protected. A similar method of indicating valve hand wear as applied with reference to the embodiment shown in FIG. 1, may also be adapted to the modification shown in FIG. 9.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. A safety valve of the globe type comprising a substantially spherical casing, having front and rear walls and a side wall, the walls defining a valve chamber, the front wall having a central opening serving as a valve seat, an inlet portion communicating with said opening and chamber, an outlet portion in the side wall communicating with said chamber, seat opening and inlet portion, said rear wall having a central opening therein, valve mechanism journalled in the opening in the rear wall, said valve mechanism including a stem threadedly extending through the opening in the rear wall and protruding outwardly and inwardly thereof, a valve head carried on the inner end of the stem in line with the seat opening and adapted to close said seat opening, a hand wheel fixed on the other outer end of the stem for turning said stem and moving the valve head onto and out of engagement with the seat opening, means for connecting the outlet portion to the inlet of a tank or container being supplied with fuel, and means associated with the hand wheel for releasably locking the valve head on its seat opening, the hand wheel being formed with a skirt portion having ratchet teeth on the inner surface of the periphery thereof, the means for releasably locking the valve head on its seat opening including a spring pressed slidable edge core having one end tapered to a knife edge, the ratchet teeth on the skirt portion being disposed in the path of movement of said knife edge whereby the hand wheel is locked against turning movement, fuel bleed means for bleeding of the liquid fuel between the valve and the valve seat of the safety valve to facilitate disconnection of the valve from the tank or container, said fuel bleed means including a dip tube extending through the chamber and outlet portion, a socket portion on the side wall of the casing, an externally threaded sleeve extending through and outwardly of said socket, the inner end of the tube extending into and communicating with the bore of said sleeve, said sleeve having a fuel vent communicating with the bore thereof, a rotatable valve member within said sleeve having a slot adapted to communicate with said fuel vent and an integral knob on the valve member, for turning the slot into and out of communication with the fuel vent.

2. A valve constructed in accordance with claim 1 wherein means is provided to visually indicate relative wear of the valve head, the indicating means including visual indicia on one of the walls of the spherical casing and cooperating indicia on the hand wheel.

3. A valve constructed in accordance with claim 2 wherein the indicia on the hand wheel is formed in a plurality of zones to indicate gradual valve wear by indicating the alignment with the indicia of the wall and one of the zones when the hand wheel is turned until the valve head is seated.

4. A valve constructed in accordance with claim 3 wherein the zones are on the skirt portion of the hand wheel.

5. A safety valve for use in transferring pressurized hydrocarbon fuels, said valve comprising a valve chamber, means forming inlet and outlet openings in said chamber, a valve stem extending into the chamber, a valve head, said valve head being secured to one end of the stem and being positioned within the valve chamber, a hand wheel, said hand wheel being secured to the other end of the stem and being positioned on the exterior of the valve chamber, cooperating means between the valve stem and the valve whereby when the valve is rotated by manually turning the hand wheel the valve head will move into a position blocking one of the openings in the valve chamber and when the stem is rotated in an opposite direction the valve head will unseat from the opening and permit the passage of fuel into the chamber from the opening and means for determining relative wear of the valve head, said wear determining means including cooperating indicia on the hand wheel and the valve body, said indicia being aligned and various portions thereof being in registry when the hand wheel is turned to seat the valve head in the opening, means for releasably locking the valve head in a position wherein it is seated within the opening, said locking means including a plurality of ratchet teeth on the hand wheel and a member resiliently projecting from the valve body in engagement with one of the teeth when the hand wheel is turned to a position seating the valve head within the one opening.

6. A valve constructed in accordance with claim 5 wherein the indicia on the hand wheel is divided into zones whereby relative wear of the valve head may be observed.

7. A valve constructed in accordance with claim 5 wherein the hand wheel includes a skirt portion, the indicia on the hand wheel being positioned on said skirt portion.

8. A valve constructed in accordance with claim 5 wherein the means resiliently engaging one of the ratchet teeth includes a spring pressed slidable edge core having one end tapered to a knife edge.

9. A valve constructed in accordance with claim 8 wherein bleed means are provided for relieving the pressure within the valve chamber to facilitate the removal of the valve from a tank or container, the bleed means including a dip tube extending through the chamber and a selectively operable valve member communicating with one end of said tube.

* * * * *